US008786682B2

(12) United States Patent
Shpunt et al.

(10) Patent No.: US 8,786,682 B2
(45) Date of Patent: Jul. 22, 2014

(54) REFERENCE IMAGE TECHNIQUES FOR THREE-DIMENSIONAL SENSING

(75) Inventors: Alexander Shpunt, Tel Aviv (IL); Dmitri Rais, Ramat Gan (IL); Niv Galezer, Tel Aviv (IL)

(73) Assignee: Primesense Ltd., Tel Aviv (IL)

( * ) Notice: Subject to any disclaimer, the term of this patent is extended or adjusted under 35 U.S.C. 154(b) by 1151 days.

(21) Appl. No.: 12/707,678

(22) Filed: Feb. 18, 2010

(65) Prior Publication Data

US 2010/0225746 A1 Sep. 9, 2010

Related U.S. Application Data

(60) Provisional application No. 61/157,560, filed on Mar. 5, 2009.

(51) Int. Cl.
*H04N 13/02* (2006.01)
*G03B 21/14* (2006.01)
*G01B 11/25* (2006.01)

(52) U.S. Cl.
CPC ................... *G01B 11/2545* (2013.01)
USPC .............. 348/50; 353/70; 348/E13.074

(58) Field of Classification Search
CPC .................................... G01B 11/2545
USPC .......................... 348/50; 356/603
See application file for complete search history.

(56) References Cited

U.S. PATENT DOCUMENTS

| 4,336,978 A | 6/1982 | Suzuki |
| 4,542,376 A | 9/1985 | Bass et al. |
| 4,802,759 A | 2/1989 | Matsumoto et al. |
| 4,843,568 A | 6/1989 | Krueger et al. |
| 5,075,562 A | 12/1991 | Greivenkamp et al. |
| 5,483,261 A | 1/1996 | Yasutake |
| 5,630,043 A | 5/1997 | Uhlin |
| 5,636,025 A | 6/1997 | Bieman et al. |
| 5,835,218 A | 11/1998 | Harding |
| 5,838,428 A | 11/1998 | Pipitone et al. |
| 5,856,871 A | 1/1999 | Cabib et al. |
| 5,909,312 A | 6/1999 | Mendlovic et al. |
| 6,041,140 A | 3/2000 | Binns et al. |

(Continued)

FOREIGN PATENT DOCUMENTS

| DE | 19736169 A1 | 8/1997 |
| DE | 19638727 A1 | 3/1998 |

(Continued)

OTHER PUBLICATIONS

Chinese Patent Application # 200780006560.6 Official Action dated Oct. 11, 2010.

(Continued)

*Primary Examiner* — Andy Rao
*Assistant Examiner* — Tyler Edwards
(74) *Attorney, Agent, or Firm* — D. Kligler I.P. Services Ltd.

(57) ABSTRACT

A method including providing a device that projects a pattern of coherent radiation. The method further includes capturing a reference image of the pattern using an image sensor by projecting the pattern of the coherent radiation onto a reference surface and engendering a relative motion between the reference surface and the image sensor while capturing the reference image. The method also includes storing the reference image in a memory associated with the device.

12 Claims, 10 Drawing Sheets

(56) References Cited

U.S. PATENT DOCUMENTS

| | | | |
|---|---|---|---|
| 6,081,269 A | 6/2000 | Quarendon | |
| 6,084,712 A | 7/2000 | Harding | |
| 6,088,105 A | 7/2000 | Link | |
| 6,099,134 A | 8/2000 | Taniguchi et al. | |
| 6,100,517 A | 8/2000 | Yahav et al. | |
| 6,101,269 A | 8/2000 | Hunter et al. | |
| 6,108,036 A | 8/2000 | Harada et al. | |
| 6,167,151 A | 12/2000 | Albeck | |
| 6,259,561 B1 | 7/2001 | George et al. | |
| 6,262,740 B1 | 7/2001 | Lauer et al. | |
| 6,268,923 B1 | 7/2001 | Michniewicz et al. | |
| 6,301,059 B1 | 10/2001 | Huang et al. | |
| 6,377,700 B1 | 4/2002 | Mack et al. | |
| 6,438,263 B2 | 8/2002 | Albeck et al. | |
| 6,494,837 B2 | 12/2002 | Kim et al. | |
| 6,495,848 B1 | 12/2002 | Rubbert | |
| 6,686,921 B1 | 2/2004 | Rushmeier et al. | |
| 6,700,669 B1 * | 3/2004 | Geng | 356/603 |
| 6,731,391 B1 | 5/2004 | Kao et al. | |
| 6,741,251 B2 | 5/2004 | Malzbender | |
| 6,751,344 B1 | 6/2004 | Grumbine | |
| 6,754,370 B1 | 6/2004 | Rusinkiewicz et al. | |
| 6,759,646 B1 | 7/2004 | Acharya et al. | |
| 6,803,777 B2 | 10/2004 | Pfaff et al. | |
| 6,810,135 B1 | 10/2004 | Berenz et al. | |
| 6,813,440 B1 | 11/2004 | Yu et al. | |
| 6,825,985 B2 | 11/2004 | Brown et al. | |
| 6,841,780 B2 | 1/2005 | Cofer et al. | |
| 6,859,326 B2 | 2/2005 | Sales | |
| 6,937,348 B2 | 8/2005 | Geng | |
| 7,006,952 B1 | 2/2006 | Matsumoto et al. | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,194,105 B2 | 3/2007 | Hersch et al. | |
| 7,231,069 B2 | 6/2007 | Nahata | |
| 7,256,899 B1 | 8/2007 | Faul et al. | |
| 7,335,898 B2 | 2/2008 | Donders et al. | |
| 7,369,685 B2 | 5/2008 | DeLean | |
| 7,385,708 B2 | 6/2008 | Ackerman et al. | |
| 7,433,024 B2 | 10/2008 | Garcia et al. | |
| 7,551,719 B2 | 6/2009 | Yokhin et al. | |
| 7,560,679 B1 | 7/2009 | Gutierrez | |
| 7,659,995 B2 | 2/2010 | Knighton et al. | |
| 7,700,904 B2 | 4/2010 | Toyoda et al. | |
| 7,751,063 B2 | 7/2010 | Dillon et al. | |
| 7,811,825 B2 | 10/2010 | Fauver et al. | |
| 7,840,031 B2 | 11/2010 | Albertson et al. | |
| 7,952,781 B2 | 5/2011 | Weiss et al. | |
| 8,018,579 B1 | 9/2011 | Krah | |
| 8,035,806 B2 | 10/2011 | Jin et al. | |
| 8,126,261 B2 | 2/2012 | Medioni et al. | |
| 8,326,025 B2 | 12/2012 | Boughorbel | |
| 2001/0016063 A1 | 8/2001 | Albeck et al. | |
| 2002/0041327 A1 | 4/2002 | Hildreth et al. | |
| 2002/0075456 A1 | 6/2002 | Shiratani | |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0001145 A1 | 1/2004 | Abbate | |
| 2004/0063235 A1 | 4/2004 | Chang | |
| 2004/0105580 A1 | 6/2004 | Hager et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2004/0264764 A1 * | 12/2004 | Kochi et al. | 382/154 |
| 2005/0018209 A1 | 1/2005 | Lemelin et al. | |
| 2005/0052637 A1 | 3/2005 | Shaw et al. | |
| 2005/0111705 A1 | 5/2005 | Waupotitsch et al. | |
| 2005/0134582 A1 | 6/2005 | Claus et al. | |
| 2005/0135555 A1 | 6/2005 | Claus et al. | |
| 2005/0200838 A1 | 9/2005 | Shaw et al. | |
| 2005/0200925 A1 | 9/2005 | Brotherton-Ratcliffe et al. | |
| 2005/0231465 A1 | 10/2005 | DePue et al. | |
| 2005/0271279 A1 | 12/2005 | Fujimura et al. | |
| 2006/0017656 A1 | 1/2006 | Miyahara | |
| 2006/0072851 A1 | 4/2006 | Kang et al. | |
| 2006/0156756 A1 | 7/2006 | Becke | |
| 2006/0221218 A1 | 10/2006 | Adler et al. | |
| 2006/0221250 A1 | 10/2006 | Rossbach et al. | |
| 2006/0269896 A1 | 11/2006 | Liu et al. | |
| 2007/0057946 A1 * | 3/2007 | Albeck et al. | 345/427 |
| 2007/0060336 A1 | 3/2007 | Marks et al. | |
| 2007/0133840 A1 | 6/2007 | Cilia | |
| 2007/0165243 A1 | 7/2007 | Kang et al. | |
| 2007/0262985 A1 | 11/2007 | Watanabe et al. | |
| 2008/0018595 A1 | 1/2008 | Hildreth et al. | |
| 2008/0031513 A1 | 2/2008 | Hart | |
| 2008/0037829 A1 | 2/2008 | Givon | |
| 2008/0106746 A1 | 5/2008 | Shpunt et al. | |
| 2008/0118143 A1 | 5/2008 | Gordon et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0247670 A1 | 10/2008 | Tam et al. | |
| 2008/0278572 A1 | 11/2008 | Gharib et al. | |
| 2008/0285827 A1 | 11/2008 | Meyer et al. | |
| 2009/0016642 A1 | 1/2009 | Hart | |
| 2009/0046152 A1 | 2/2009 | Aman | |
| 2009/0060307 A1 | 3/2009 | Ghanem et al. | |
| 2009/0096783 A1 | 4/2009 | Shpunt et al. | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2009/0226079 A1 | 9/2009 | Katz et al. | |
| 2009/0244309 A1 | 10/2009 | Maison et al. | |
| 2010/0007717 A1 | 1/2010 | Spektor et al. | |
| 2010/0013860 A1 | 1/2010 | Mandella et al. | |
| 2010/0020078 A1 | 1/2010 | Shpunt | |
| 2010/0118123 A1 | 5/2010 | Freedman et al. | |
| 2010/0128221 A1 | 5/2010 | Muller et al. | |
| 2010/0142014 A1 | 6/2010 | Rosen et al. | |
| 2010/0177164 A1 | 7/2010 | Zalevsky | |
| 2010/0182406 A1 | 7/2010 | Benitez | |
| 2010/0194745 A1 | 8/2010 | Leister et al. | |
| 2010/0201811 A1 | 8/2010 | Garcia et al. | |
| 2010/0225746 A1 | 9/2010 | Shpunt et al. | |
| 2010/0243899 A1 | 9/2010 | Ovsiannikov et al. | |
| 2010/0245826 A1 | 9/2010 | Lee | |
| 2010/0265316 A1 | 10/2010 | Sali et al. | |
| 2010/0278384 A1 | 11/2010 | Shotton et al. | |
| 2010/0284082 A1 | 11/2010 | Shpunt et al. | |
| 2010/0290698 A1 | 11/2010 | Shpunt et al. | |
| 2010/0303289 A1 | 12/2010 | Polzin et al. | |
| 2011/0001799 A1 | 1/2011 | Rothenberger et al. | |
| 2011/0025827 A1 | 2/2011 | Shpunt et al. | |
| 2011/0043403 A1 | 2/2011 | Loffler | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0158508 A1 | 6/2011 | Shpunt et al. | |
| 2011/0211044 A1 | 9/2011 | Shpunt et al. | |
| 2011/0279648 A1 | 11/2011 | Lutian et al. | |
| 2011/0285910 A1 | 11/2011 | Bamji et al. | |
| 2011/0310125 A1 | 12/2011 | McEldowney et al. | |
| 2012/0012899 A1 | 1/2012 | Jin et al. | |
| 2012/0051588 A1 | 3/2012 | McEldowney | |

FOREIGN PATENT DOCUMENTS

| | | |
|---|---|---|
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |

(56) References Cited

FOREIGN PATENT DOCUMENTS

| | | |
|---|---|---|
| JP | 2000131040 A | 5/2000 |
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |
| WO | 2007043036 A1 | 4/2007 |
| WO | 2007096893 A2 | 8/2007 |
| WO | 2007105205 A2 | 9/2007 |
| WO | 2007105215 A2 | 9/2007 |
| WO | 2008120217 A2 | 10/2008 |

OTHER PUBLICATIONS

International Application PCT/IB2010/053430 Search Report dated Dec. 28, 2010.
Scharstein et al., "High-Accuracy Stereo Depth Maps Using Structured Light", IEEE Proceedings of the Conference on Computer Vision and Pattern Recognition, pp. 165-171, Jun. 18, 2003.
Koschan et al., Dense Depth Maps by Active Color Illumination and Image Pyramids, Advances in Computer Vision, pp. 137-148, Springer 1997.
Marcia et al., "Fast Disambiguation of Superimposed Images for Increased Field of View", IEEE International Conference on Image Processing, San Diego, USA, Oct. 12-15, 2008.
U.S. Appl. No. 12/844,864 "Depth Mapping Based on Pattern Matching and Stereoscopic Information" filed on Jul. 28, 2010.
Microvision Inc., "Micro-Electro-Mechanical System (MEMS) Scanning Mirror", years 1996-2009.
U.S. Appl. No. 61/372,729 "Scanning projectors for 3D mapping" filed on Aug. 11, 2010.
U.S. Appl. No. 61/425,788 "Scanning projectors and image capture modules" filed on Dec. 22, 2010.
U.S. Appl. No. 61/415,352 "Depth mapping using time-coded illumination" filed on Nov. 19, 2010.
U.S. Appl. No. 61/419,891 "Lens Arrays for Pattern Projection and Imaging" filed on Dec. 6, 2010.
U.S. Appl. No. 61/309,000 "Commitment-Based Resource Allocation for 3D Mapping" filed on Mar. 1, 2010.
Btendo, "Two Uni-axial Scanning Mirrors Vs One Bi-axial Scanning Mirror", Kfar Saba, Israel, Aug. 13, 2008.
Japanese Patent Application # 2011-517308 Official Action dated Dec. 5, 2012.
U.S. Appl. No. 12/844,864 Official Action dated Dec. 6, 2012.
U.S. Appl. No. 12/758,047 Official Action dated Oct. 25, 2012.
U.S. Appl. No. 13/036,023 Official Action dated Jan. 7, 2013.
Japanese Patent Application # 2008558981 Official Action dated Nov. 2, 2011.
US Patent Application # 121522,171 Official Action dated Dec. 22, 2011.
US Patent Application # 121522,172 Official Action dated Nov. 30, 2011.
Japanese Patent Application # 2008558984 Official Action dated Nov. 1, 2011.
U.S. Appl. No. 13/043,488 Official Action dated Jan. 3, 2012.
Japanese Patent Application # 2008535179 Official Action dated Nov. 8, 2011.
Chinese Patent Application # 2006800038004.2 Official Action dated Nov. 24, 2011.
Marcia et al., "Superimposed Video Disambiguation for Increased Field of View", Optics Express 16:21, pp. 16352-16363, year 2008.
Guan et al., "Composite Structured Light Pattern for Three Dimensional Video", Optics Express 11:5, pp. 406-417, year 2008.
U.S. Appl. No. 13/311,584 filed on Dec. 6, 2011.
PCT Application PCT/IB2011/055155 filed on Nov. 17, 2011.
International Application No. PCT/IB2010/053430 Search Report dated Dec. 28, 2010.
Chinese Patent Application # 200680038004.2 Official Action dated Dec. 24, 2010.
Yao Kun et al., "Measurnnent of Space Distribution of Laser Gaussian Beam by Speckles Displacement Method", High Power Laser and Particle Beams, vol. 12, No. 2, pp. 141-144, Apr. 30, 2000.
Zhu et al., "Fusion of time-of-flight depth and stereo for high accuracy depth maps", Proceedings of the IEEE Conference on Computer Vision and Pattern Recognition, pp. 1-8, Jun. 23, 2008.
Koschan et al., "Dense Depth Maps by Active Color Illumination and Image Pyramids", Advances in Computer Vision, pp. 137-148, 1997.
Scharstein et al., "High-Accuracy Stereo Depth Maps Using Structured Light", IEEE Proceedings of the Computer Society Conference on Computer Vision and Pattern Recognition, pp. 165-171, Jun. 18, 2003.
Chinese Patent Application # 200780016625.5 Official Action dated Oct. 26, 2010.
Chinese Patent Application # 200780006560.6 Official Action dated Feb. 1, 2011.
U.S. Appl. No. 12/522,171 Official Action dated Apr. 5, 2012.
U.S. Appl. No. 12/397,362 Official Action dated Apr. 24, 2012.
International Application PCT/IB2011/053560 Search Report dated Jan. 19, 2012.
International Application PCT/IB2011/055155 Search Report dated Apr. 20, 2012.
U.S. Appl. No. 13/311,589 filed Dec. 6, 2011.
U.S. Appl. No. 13/437,977, filed Apr. 3, 2012.
U.S. Appl. No. 61/598,921, filed Feb. 15, 2012.
Richardson, W. H., "Bayesian-Based Iterative Method of Image Restoration", Journal of the Optical Society of America, vol. 62, No. 1, pp. 55-59, Jan. 1972.
Omnivision Technologies Inc., "OV2710 1080p/720p HD Color CMOS Image Sensor with OmniPixel3-HS Technology", Dec. 2011.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.
Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", Hich Power Laser and Particle Beams, vol. 12, No. 2, Apr. 2000.
Hart, D., U.S. Appl. No. 09/616,606 "Method and System for High Resolution , Ultra Fast 3-D Imaging" filed on Jul. 14, 2000.
International Application PCT/IL2007/000306 Search Report dated Oct. 2, 2008.
International Application PCT/IL20027/000262 Search Report dated Oct. 16, 2008.
International Application PCT/IL2008/000458 Search Report dated Oct. 28, 2008.
International Application PCT/IL2007/000327 Search Report dated Sep. 26, 2008.
Takeda et al., "Fourier Transform Methods of Fringe-Pattern Analysis for Computer-Based Topography and Interferometry", Journal of Optical Society of America, vol. 72, No. 1, Jan. 1982.
Sazbon et al., "Qualitative real-time range extraction for preplanned scene partitioning using laser beam coding", Pattern Recognition Letters 26, pp. 1772-1781, year 2005.
Sjodahl et al., "Measurement of shape by using projected random and patterns and temporal digital speckle photography", Applied Optics, vol. 38, No. 10, Apr. 1, 1999.
Garcia et al., "Three dimensional mapping and range measurement by means of projected speckle patterns", Applied Optics, vol. 47, No. 16, Jun. 1, 2008.

(56) References Cited

OTHER PUBLICATIONS

Chen et al., "Measuring of a Three-Dimensional Surface by Use of a Spatial Distance Computation", Applied Optics, vol. 42, issue 11, pp. 1958-1972, 2003.

Ypsilos et al- "Speech-driven Face Synthesis from 3D Video", 2nd International Symposium on 3D Processing, . Visualization and Transmission, Thessaloniki, Greece, Sep. 6-9, 2004.

Hanson et al. "Optics and Fluid Dynamics Department", Annual Progress Report for 1997 (an abstract).

International Application PCT/IL2006/000335 Preliminary Report on Patentability dated Apr. 24, 2008.

International Application PCT/IL2008/000095 Search Report dated Jul. 24, 2008.

International Application PCT/IL2009/000285 Search Report dated Jun. 11, 2009.

Goodman, J.W., "Statistical Properties of Laser Speckle Patterns", Laser Speckle and Related Phenomena, pp. 9-75, Springer-Verlag, Berlin Heidelberg, 1975.

Doty, J.L., "Projection Moire for Remote Contour Analysis", Journal of Optical Society of America, vol. 73, No. 3, pp. 366-372, Mar. 1983.

Avidan et al., "Trajectory triangulation: 3D reconstruction of moving points from amonocular image sequence", IEEE Transactions on Pattern Analysis and Machine Intelligence, vol. 22, No. 4, pages, Apr. 2000.

Leclerc et al., "The direct computation of height from shading", Proceedings of Computer Vision and Pattern Recognition, pp. 552-558, year 1991.

Zhang et al., "Shape from intensity gradient", IEEE Transactions on Systems, Man and Cybernetics—Part A: Systems and Humans, vol. 29, No. 3, pp. 318-325, May 1999.

Zhang et al., "Height recovery from intensity gradients", Proceedings of IEEE Computer Society Conference on Computer Vision and Pattern Recognition, pp. 508-513, year 1994.

Horn, B., "Height and gradient from shading", International Journal of Computer Vision, No. 5, pp. 37-76, year 1990.

Bruckstein, A., "On shape from shading", Computer Vision, Graphics, and Image Processing, vol. 44, pp. 139-154, year 1988.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.

Besl, P., "Active Optical Range Imaging Sensors", Machine Vision and Applications, No. 1, pp. 127-152, USA 1988.

Horn et al., "Toward optimal structured light patterns", Proceedings of International Conference on Recent Advances in 3D Digital Imaging and Modeling, pp. 28-37, Ottawa, Canada, May 1997.

Mendlovic, et al., "Composite harmonic filters for scale, projection and shift invariant pattern recognition", Applied Optics, vol. 34, No. 2, pp. 310-316, Jan. 10, 1995.

Asada et al., "Determining Surface Orientation by Projecting a Stripe Pattern", IEEE Transactions on Pattern Analysis and Machine Intelligence, vol. 10, No. 5, year 1988.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.

Kimmel et al., Analyzing and synthesizing images by evolving curves with the Osher-Sethian method, International Journal of Computer Vision, 24(1), pp. 37-56 , year 1997.

Zigelman et al., "Texture mapping using surface flattening via multidimensional scaling", IEEE Transactions on Visualization and Computer Graphics, 8 (2), pp. 198-207, year 2002.

Dainty, J.C., "Introduction", Laser Speckle and Related Phenomena, pp. 1-7, Springer-Verlag, Berlin Heidelberg, 1975.

Ypsilos et al., "Video-rate capture of Dynamic Face Shape and Appearance", Sixth IEEE International Conference on Automatic Face and Gesture Recognition (FGR 2004), Seoul, Korea, May 17-19, 2004.

Abramson, N., "Holographic Contouring by Translation", Applied Optics Journal, vol. 15, No. 4, pp. 1018-1976, Apr. 1976.

Achan et al., "Phase Unwrapping by Minimizing Kikuchi Free Energy", IEEE International Geoscience and Remote Sensing Symposium, pp. 1738-1740, Toronto, Canada, Jun. 2002.

Theocaris et al., "Radial Gratings as Moire Gauges", Journal of Scientific Instruments (Journal of Physics E), series 2, vol. 1, year 1968.

Ben Eliezer et al., "Experimental Realization of an Imaging System with an Extended Depth of Field", Applied Optics Journal, vol. 44, No. 14, pp. 2792-2798, May 10, 2005.

Tay et al., "Grating Projection System for Surface Contour Measurement", Applied Optics Journal, vol. 44, No. 8, pp. 1393-1400, Mar. 10, 2005.

Brooks et al., "Moire Gauging Using Optical Interference Patterns", Applied Optics Journal, vol. 8, No. 5, pp. 935-940, May 1969.

Hovanesian et al., "Moire Contour-Sum Contour-Difference, and Vibration Analysis of Arbitrary Objects", Applied Optics Journal, vol. 10, No. 12, pp. 2734-2738, Dec. 1971.

Bryngdahl, 0., "Characteristics of Superposed Patterns in Optics", Journal of Optical Society of America, vol. 66, No. 2, pp. 87-94, Feb. 1976.

Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.

Chen et al., "Overview of Three-Dimensional Shape Measurement Using Optical Methods", Society of Photo-Optical Instrumentation Engineers Journal 39(1), pp. 10-22, Jan. 2000.

Takasaki, H., "Moire Topography", Applied Optics Journal, vol. 12, No. 4, pp. 845-850, Apr. 1973.

Takasaki, H., "Moire Topography", Applied Optics Journal, vol. 9, No. 6, pp. 1467-1472, Jun. 1970.

Hildebrand et al., "Multiple-Wavelength and Multiple-Source Holography Applied to Contour Generation", Journal of Optical Society of America Journal, vol. 57, No. 2, pp. 155-162, Feb. 1967.

Su et al., "Application of Modulation Measurement Profilometry to Objects with Surface Holes", Applied Optics Journal, vol. 38, No. 7, pp. 1153-1158, Mar. 1, 1999.

Lim et al., "Additive Type Moire with Computer Image Processing", Applied Optics Journal, vol. 28, No. 13, pp. 2677-2680, Jul. 1, 1989.

Hung et al., "Time-Averaged Shadow-Moire Method for Studying Vibrations", Applied Optics Journal, vol. 16, No. 6, pp. 1717-1719, Jun. 1977.

Idesawa et al., "Scanning Moire Method and Automatic Measurement of 3-D Shapes", Applied Optics Journal, vol. 16, No. 8, pp. 2152-2162, Aug. 1977.

Iizuka, K., "Divergence-Ratio Axi-Vision Camera (Divcam): A Distance Mapping Camera", Review of Scientific Instruments 77, 0451111 (2006).

Shpunt et al., U.S. Appl. No. 61/229,754 "Pattern-Based Depth Mapping with Stereoscopic Assistance" filed on Jul. 30, 2009.

Luxtera Inc., "Luxtera Announces World's First 10GBit CMOS Photonics Platform", Carlsbad, USA, Mar. 28, 2005 (press release).

Post et al., "Moire Methods for Engineering and Science—Moire Interferometry and Shadow Moire", Photomechanics (Topics in Applied Physics), vol. 77, pp. 151-196, Springer Berlin I Heidelberg, Jan. 1, 2000.

Piestun et al., "Wave Fields in Three Dimensions: Analysis and Synthesis", Journal of the Optical Society of America, vol. 13, No. 9, pp. 1837-1848, Sep. 1996.

Lee et al., "Variable Pulse Mode Driving IR Source Based 3D Robotic Camera", MVA2005 IAPR Conference on Machine Vision Applications, pp. 530-533, Japan, May 16-18, 2005.

Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.

Beraldin et al., "Active 3D Sensing", Scuola Normale Superiore Pisa, vol. 10, pp. 22-46, Apr. 2000.

(56) References Cited

OTHER PUBLICATIONS

Bhat et al., "Ordinal Measures for Image Correspondence", IEEE Transactions on Pattern Analysis and Machine Intelligence, vol. 20, No. 4, pp. 415-423, Apr. 1998.

Bradley et al., "Synchronization and Rolling Shutter Compensation for Consumer Video Camera Arrays", IEEE International Workshop on Projector-Camera Systems—PROCAMS 2009 (Miami Beach, Florida, 2009).

De Piero et al., "3D Computer Vision Using Structured Light: Design Calibration and Implementation Issues", Advances in Computers, vol. 43, pp. 243-278, Academic Press 1996.

Hongjun et al., "Shape Measurement by Digital Speckle Temporal Sequence Correlation Method", Acta Optica Sinica Journal, vol. 21, No. 10, pp. 1208-1213, Oct. 2001.

Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.

Hsueh et al., "Real-time 3D Topography by Speckle Image Correlation", Proceedings of SPIE Conference on Input/Output and Imaging Technologies, vol. 3422, pp. 108-112, Taiwan, Jul. 1998.

Chinese Patent Application # 200780009053.8 Official Action dated Apr. 15, 2010 (with English translation).

Chinese Patent Application # 200680038004.2 Official Action dated Mar. 30, 2010 (with English translation).

Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.

EZconn Czech a.S., "Site Presentation", Oct. 2009.

Garcia et al., U.S. Appl. No. 12/703,794 "Depth Ranging with Moire Patterns" filed on Feb. 11, 2010.

Sali et al., U.S. Appl. No. 12/758,047 "Three-Dimensional Mapping and Imaging" filed on Apr. 12, 2010.

Cohen et al., U.S. Appl. No. 12/605,340 "Geometrical Calibration and Correction for Depth Sensor" filed on Oct. 25, 2009.

Petronius et al., U.S. Appl. No. 61/300,465 "Integrated Photonics Module for Optical Projection" filed on Feb. 2, 2010.

Mor et al., U.S. Appl. No. 12/762,373 "Synchronization of Projected Illumination with Rolling Shutter of Image Sensor" filed on Apr. 19, 2010.

Ypsilos et al., "Speech-driven Face Synthesis from 3D Video", 2nd International Symposium on 3D Processing, Visualization and Transmission, Thessaloniki, Greece, Sep. 6-9, 2004.

Bryngdahl, O., "Characteristics of Superposed Patterns in Optics", Journal of Optical Society of America, vol. 66, No. 2, pp. 87-94, Feb. 1976.

Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.

Sali et al., U.S. App. No. 12/758,047 "Three-Dimensional Mapping and Imaging" filed on Apr. 12, 2010.

U.S. Appl. No. 13/541,775, filed Jul. 5, 2012.

U.S. Appl. No. 12/282,517 Official Action dated Jun. 12, 2012.

U.S. Appl. No. 12/522,172 Official Action dated Jun. 29, 2012.

U.S. Appl. No. 12/703,794 Official Action dated Aug. 7, 2012.

U.S. Appl. No. 12/522,176 Official Action dated Aug. 2, 2012.

JP Patent Application # 2008558984 Office Action dated Jul. 3, 2012.

Engfield, N., "Use of Pseudorandom Encoded Grid in U.S. Appl. No. 11/899,542", Andrews Robichaud, Jun. 22, 2011.

U.S. Appl. No. 61/471,215, filed Apr. 4, 2011.

Chinese Patent Application # 200680038004.2 Official Action dated Aug. 3, 2011 (English translation).

International Application PCT/IB2011/053560 filed on Aug. 10, 2011.

U.S. Appl. No. 61/419,891, filed Dec. 6, 2010.

U.S. Appl. No. 61/415,352, filed Nov. 19, 2010.

Korean Patent Application # 10-2008-7025030 Office Action dated Feb. 25, 2013.

U.S. Appl. No. 12/844,864 Office Action dated Apr. 11, 2013.

U.S. Appl. No. 12/758,047 Office Action dated Apr. 25, 2013.

Japanese Patent Application # 2011-517308 Office Action dated Jun. 19, 2013.

U.S. Appl. No. 13/036,023 Office Action dated Jul. 17, 2013.

U.S. Appl. No. 13/036,023 Office Action dated Sep. 3, 2013.

International Application PCT/IB2013/051189 Search Report dated Jun. 18, 2013.

U.S. Appl. No. 12/844,864 Office Action dated Sep. 26, 2013.

U.S. Appl. No. 13/921,224 Office Action dated Oct. 3, 2013.

U.S. Appl. No. 12/958,427 Office Action dated Nov. 22, 2013.

* cited by examiner

REFERENCE IMAGE TECHNIQUES FOR THREE-DIMENSIONAL SENSING

CROSS-REFERENCE TO RELATED APPLICATION

This application claims the benefit of U.S. Provisional Patent Application 61/157,560, filed Mar. 5, 2009, which is incorporated herein by reference.

FIELD OF THE INVENTION

The present invention relates generally to imaging systems, and specifically to imaging systems using reference images for three-dimensional mapping.

BACKGROUND OF THE INVENTION

Some three-dimensional (3D) mapping systems use a reference image of a pattern projected onto a calibration surface. Examples of such systems are described in PCT Publication WO 2007/043036 to Zalevsky et al., and in PCT Publication WO 2007/105205 to Shpunt et al., both of which are incorporated herein by reference. In these types of 3D mapping systems, measured deviations from the reference image in an image of a test object allows the test object to be mapped. It is thus advantageous to use high quality reference images in the mapping systems.

The description above is presented as a general overview of related art in this field and should not be construed as an admission that any of the information it contains constitutes prior art against the present patent application.

SUMMARY OF THE INVENTION

An embodiment of the present invention provides a method, including:

providing a device that projects a pattern of coherent radiation;

capturing a reference image of the pattern using an image sensor by projecting the pattern of the coherent radiation onto a reference surface and engendering a relative motion between the reference surface and the image sensor while capturing the reference image; and storing the reference image in a memory associated with the device.

Typically, engendering the relative motion includes connecting a motion actuator to the device and activating the motion actuator while capturing the reference image.

Alternatively or additionally, engendering the relative motion includes connecting a motion actuator to a reference object having the reference surface, and activating the motion actuator while capturing the reference image.

Engendering the relative motion may include moving the device parallel to the reference surface, moving the reference surface parallel to itself, selecting an amplitude of the relative motion so as to average out effects of secondary speckles generated at the reference surface, and/or selecting an amplitude of the relative motion in response to a resolution of the image sensor.

The device may include the image sensor, the method further including:

capturing an alternative image of the pattern projected onto the reference surface using another image sensor external to the device;

registering the reference image and the alternative image; and producing an enhanced reference image from the registered reference image and alternative image, wherein storing the reference image in the memory includes storing the enhanced reference image in the memory.

In a disclosed embodiment, capturing the reference image includes:

capturing a first image of the pattern while the reference surface is at a first distance from the device, and a second image of the pattern while the reference surface is at a second distance, different from the first distance, from the device; and registering the first and second images to produce an alternative reference image, wherein storing the reference image in the memory includes storing the alternative reference image in the memory.

In another disclosed embodiment, capturing the reference image includes:

capturing a first image of the pattern while the reference surface is at a first distance from the device, and a second image of the pattern while the reference surface is at a second distance, different from the first distance, from the device, the first and the second images being configured to be registered to produce an alternative reference image; and storing the first and second images in the memory.

Typically, the device is configured to generate a three-dimensional (3D) map of an object by capturing a test image of the pattern on the object and measuring local transverse shifts of the pattern in the test image relative to the reference image.

The device may include the image sensor, and capturing the test image may include capturing the test image using the image sensor.

In some embodiments the image sensor has an integration time, and the reference surface is stationary as measured with respect to the integration time.

There is further provided, according to an embodiment of the present invention, a method, including:

providing a device that projects a pattern onto an object and captures an image of the pattern on the object using a first image sensor having a first optical characteristic;

capturing a reference image of the pattern using a second image sensor having a second optical characteristic enhanced with respect to the first optical characteristic, by projecting the pattern onto a reference surface;

registering the reference image in a frame of reference of the device; and storing the reference image in a memory associated with the device.

Typically, capturing the reference image includes capturing a first image of the pattern projected onto the reference surface using the first image sensor, and capturing a second image of the pattern projected onto the reference surface using the second image sensor, and wherein registering the reference image includes registering the first and second images to produce a registered reference image, and wherein storing the reference image includes storing the registered reference image in the memory.

Typically the device includes the first image sensor, and the second image sensor is external to and separate from the device.

The pattern may be projected using incoherent radiation.

The first and second optical characteristics may include at least one of respective fields of view, respective resolutions, respective signal to noise ratios, and respective dynamic ranges.

Typically, the device is configured to generate a three-dimensional (3D) map of the object by capturing a test image of the pattern on the object and measuring local transverse shifts of the pattern in the test image relative to the reference image.

In one embodiment the method further includes generating a map of the object using the reference image and the image of the pattern on the object.

There is further provided, according to an embodiment of the present invention, a method, including:

providing a device that projects a pattern onto an object;

capturing a reference image of the pattern using an image sensor by projecting the pattern onto a reference surface located at a first distance from the image sensor and at a second distance, different from the first distance, from the image sensor;

registering the reference image in a frame of reference of the device; and storing the reference image in a memory associated with the device.

Typically, capturing the reference image includes capturing a first image of the pattern projected onto the reference surface at the first distance using the image sensor, and capturing a second image of the pattern projected onto the reference surface at the second surface using the image sensor, and wherein registering the reference image includes registering the first and second images to produce a registered reference image, and wherein storing the reference image includes storing the registered reference image in the memory.

In a disclosed embodiment projecting the pattern includes projecting the pattern into a first field of view, and wherein the image sensor has a second field of view different from the first field of view.

The image sensor may have a field of view including a subset of the reference image.

Typically, the device is configured to generate a three-dimensional (3D) map of the object by capturing a test image of the pattern on the object and measuring local transverse shifts of the pattern in the test image relative to the reference image.

Typically, the method includes generating a map of the object using the reference image and the image of the pattern on the object.

There is further provided, according to an embodiment of the invention, apparatus, including:

a projection and imaging device including:

a projector that projects a pattern of coherent radiation; and an image sensor that captures a reference image of the pattern of coherent radiation projected onto a reference surface; and a processor which is configured to:

implement a relative motion between the device and the reference surface while the image sensor captures the reference image, and store the reference image in a memory associated with the device.

There is further provided, according to an embodiment of the invention, apparatus, including:

a projection and imaging device including:

a projector that projects a pattern of radiation onto an object; and a first image sensor having a first optical characteristic, that captures an image of the pattern on the object;

a second image sensor having a second optical characteristic enhanced with respect to the first optical characteristic and which is configured to capture a reference image of the pattern projected onto a reference surface; and a processor that is configured to:

register the reference image in a frame of reference of the device; and store the registered reference image in a memory associated with the device.

There is further provided, according to an embodiment of the present invention, apparatus, including:

a projection and imaging device including:

a projector that projects a pattern of radiation; and an image sensor that captures a reference image of the pattern projected on a reference surface; and a processor which is configured to:

generate the reference image by projecting the pattern onto the reference surface located at a first distance from the image sensor and at a second distance, different from the first distance, from the image sensor, register the reference image in a frame of reference of the device, and store the registered reference image in a memory associated with the device.

There is further provided, according to an embodiment of the present invention, a method, including:

providing a device that projects a pattern onto an object;

capturing a reference image of the pattern using an image sensor by projecting the pattern onto a reference surface which is oriented with respect to the image sensor to have a first region of the reference surface a first distance from the image sensor and to have a second region of the reference surface a second distance, different from the first distance, from the image sensor;

registering the reference image in a frame of reference of the device; and storing the reference image in a memory associated with the device.

Typically, the reference surface is planar and is oriented non-orthogonally with respect to an optical axis of the image sensor.

The reference surface may be curved between the first distance and the second distance. A curvature of the reference surface may be preconfigured to match a geometrical disparity between the image sensor and a projector configured to project the pattern, so as to introduce a constant rate of shrinkage of the reference image.

There is further provided, according to an embodiment of the present invention, apparatus, including:

a projection and imaging device including:

a projector that projects a pattern of radiation onto an object; and an image sensor that captures a reference image of the pattern projected onto a reference surface which is oriented with respect to the image sensor to have a first region of the reference surface a first distance from the image sensor and to have a second region of the reference surface a second distance, different from the first distance, from the image sensor; and a processor which is configured to:

use the image sensor to capture the reference image by projecting the pattern onto the reference surface, register the reference image in a frame of reference of the device, and store the registered reference image in a memory associated with the device.

The present invention will be more fully understood from the following detailed description of the embodiments thereof, taken together with the drawings in which:

DETAILED DESCRIPTION OF EMBODIMENTS

Overview

Embodiments of the present invention produce an enhanced quality reference image for a device that generates a three-dimensional (3D) map of a test object. The device projects a pattern onto a calibration object, and captures an image of the projected pattern as the reference image. The pattern is then projected onto the test object and the device images the projected pattern. The device measures transverse shifts in the imaged pattern of the test object, compared to the reference image, to generate a 3D map of the test object.

In some embodiments, the pattern is formed using coherent radiation. Speckles in the reference image, caused by non-specularity or roughness in the calibration object, are removed by applying a small relative motion between the device and the calibration object. Removal of the speckles enhances the quality of the reference image.

In some embodiments the reference image is formed by capturing two different images of the pattern projected onto the calibration object. The different images are registered with each other, and the enhanced quality reference image is generated from the registered images.

While for the sake of concreteness, the embodiments concentrate on 3D mapping device, it should be understood that the methods of the present invention are beneficially applicable to any setup requiring enhancement of the image of the projected pattern.

Detailed Description

Figure 1:
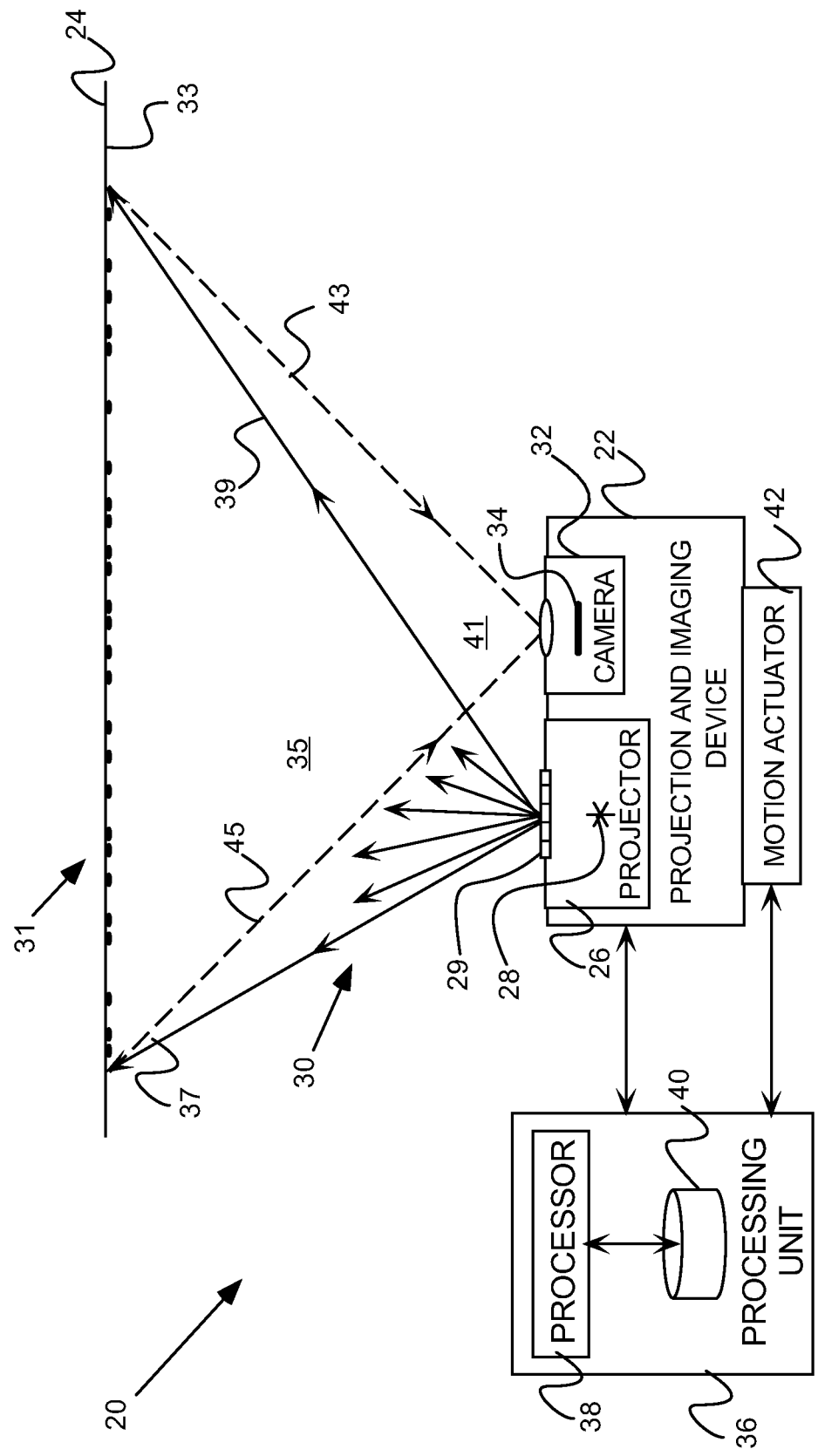
FIG. 1 is a schematic block diagram of a system for generating a reference image, according to an embodiment of the present invention.

Reference is now made to FIG. 1, which is a schematic block diagram of a system 20 for generating a reference image, according to an embodiment of the present invention. FIG. 1 and the other block diagrams in this disclosure are top views. System 20 comprises a projection and imaging device 22, which is used for performing three-dimensional (3D) mapping of objects. The operation and functioning of a device similar to device are described in more detail in PCT Publication WO 2007/043036, referred to in the Background of the Invention.

Device 22 comprises a projector 26, which uses a coherent source of radiation 28, typically a laser diode, followed by a projection optics 29, to generate a pattern 30 of the radiation. Pattern 30 projects in a field of view (FOV) 35 of the projector, the field of view being illustrated schematically in FIG. 1 by projector FOV bounding lines 37 and 39. The projector projects pattern onto a reference object 24 acting as a calibration object for system 20, and the pattern typically images as a base reference 31 on a reference surface 33 of object 24. Projection optics 29 may vary according to application, and may include but are not limited to a diffractive optical element projector, a micro-lens projector, a diffuser-based primary speckle projector, or other type of projector utilizing coherent light. Depending on the specific projector embodiment and the system requirements for device 22, the base reference may have a relatively complicated structure. For clarity and simplicity and by way of example, in the following description the base reference is assumed to comprise an array of distinct spots distributed in some fashion over the reference surface, so that base reference 31 may also be referred to as array of spots 31. Those having ordinary skill in the art will be able to adapt the description, mutatis mutandis, for base references having a structure other than that of distinct spots.

Device 22 also comprises an image sensor 32, herein also referred to as a device camera 32. The device camera has a field of view 41, which is illustrated schematically by device camera FOV bounding lines 43 and 45. Camera 32 is configured to capture an image of the spots formed by pattern 30 on an array 34, typically a CCD (charge coupled device) array or CMOS (complementary metal-oxide-semiconductor), in the device camera. Array 34, together with optics of the camera, effectively defines a frame of reference of camera 32. The fields of view of projector 26 and device camera 32 are generally different, but by way of example are assumed to overlap at reference object 24, so that the image captured by the camera comprises all the spots projected onto the reference object by the projector.

The captured image is analyzed in a processing unit 36 of the system, to generate a reference image for use by device 22 in 3D mapping of objects other than the reference object. Such objects are assumed, by way of example, to comprise an "object-to-be-mapped" by system 20, also referred to herein as a test object.

Processing unit 36 comprises a processor 38 and a memory 40, typically including non-volatile and volatile sections. Processor 38 typically stores system operating software, including the reference image, in a non-volatile section of memory 40. Processing unit 36 may be physically separate from device 22, or alternatively, the processing unit may be incorporated together with device 22 into a single package.

The software used by processor 38 may be downloaded to processing unit 36 in electronic form, over a network, for example, or it may alternatively be supplied to the processing unit on tangible media, such as on a CD-ROM.

Once the reference image has been obtained and stored, device 22, together with processing unit 36, is able to perform 3D mapping of the test object. The 3D mapping is performed by projecting pattern 30 onto the test object, whereupon camera 32 captures an image of the pattern projected onto the test object. Processor 38 measures local transverse shifts of the spots of the pattern in the test image relative to respective spots, corresponding to spots 31, in the reference image. Using the transverse shifts, the processor is able to measure depths of the test object at the positions of the spots projected onto the test object.

As stated above, pattern 30 is formed by optics 29 using coherent light source. Because of the necessarily non-specular nature of surface 33, so called secondary speckles are generated at the surface. The term "secondary" refers to the fact that these speckles come from the roughness of the surface on which the projected pattern impinges. The secondary speckles are caused by adjacent regions of the surface scattering their incident coherent radiation so that the scattered radiation interferes constructively or destructively. The adjacent regions are typically in portions of the surface upon which a spot 31 is formed. In addition to being a function of the characteristics of surface 33, the secondary speckle characteristics depend on properties of the incident coherent radiation, as well as on the numerical aperture of the image sensor, camera 32.

Array 34 has a finite integration time, typically of the order of 33 ms, so that absent the embodiments described herein, images of the secondary speckle are integrated multiplicatively into the images of spots 31 comprising the reference image. This integration reduces, in some cases drastically, the contrast of the spot images. Other negative effects of the secondary speckles include the fact that in systems of interest the speckle image has a size of the order of a single pixel, and it is difficult or impossible to remove the speckle effects digitally.

These considerations apply to any system that uses coherent radiation to project patterns, and any situation where such patterns need to be captured. Moreover, the system/situation need not be confined to capturing an image for 3D mapping purposes only. Consequently, for substantially any object that is stationary relative to the integration time of the image sensor, and which is illuminated by coherent radiation, the image captured benefits from the methods described herein for removing speckles.

As explained below, embodiments of the present invention eliminate the deleterious effects on the reference image caused by the secondary speckles.

Device 22 is attached to a motion actuator 42, which is typically under control of processing unit 36. Actuator 42 is configured to move device 22, so that there is relative motion between reference object 24 and its surface 33, and image sensor 32. The motion is typically configured to be linear and oscillatory, and in some embodiments the linear direction of the motion is selected to be parallel to surface 33. However, there is no requirement that the motion be linear, oscillatory, and parallel to surface 33, and other types of motion, such as vibratory, or linear, oscillatory, and orthogonal to surface 33 may be applied by unit 42 to device 22. As explained below, the motion is applied to remove the effects on the reference image of the secondary speckles, and those having ordinary skill in the art will be able to determine an optimum type of motion to be applied to device 22, without undue experimentation.

Figure 2:
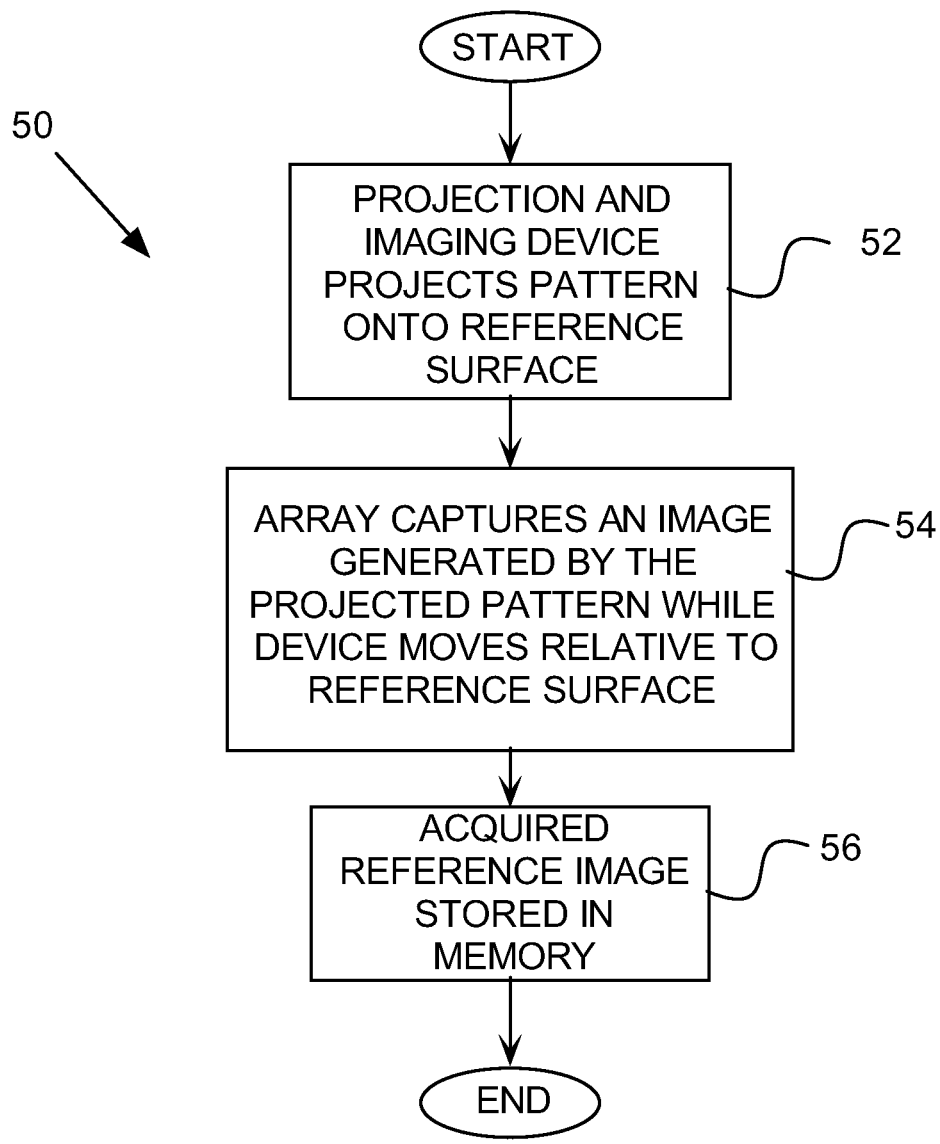
FIG. 2 is a flowchart describing steps for acquiring the reference image in the system of FIG. 1, according to an embodiment of the present invention.

FIG. 2 is a flowchart 50, describing steps for acquiring the reference image in system 20, according to an embodiment of the present invention.

In an initial step 52, projector 26 of the projection and imaging device projects pattern 30 onto reference surface 33.

In an imaging step 54, array 34 captures an image of base reference 31 generated by the projected pattern, and while capturing the image, processing unit 36 activates actuator 42 to move device 22, so that the device moves relative to reference surface 33. The type of motion applied is selected as described above with reference to FIG. 1. The amplitude of the motion is configured to be sufficient to effectively average out the effects of the secondary speckles on the image of base reference 31, while maintaining the image of the base reference very nearly constant on array 34. It will be understood that because of the characteristics of the secondary speckles, the amplitude of the motion required is small, typically finer than the resolution of camera 32, i.e., of the order of one pixel dimension or less of array 34.

In a final step 56, the acquired reference image is stored in memory 40, for use by processor 38 in 3D mapping of a test object.

Figure 3:
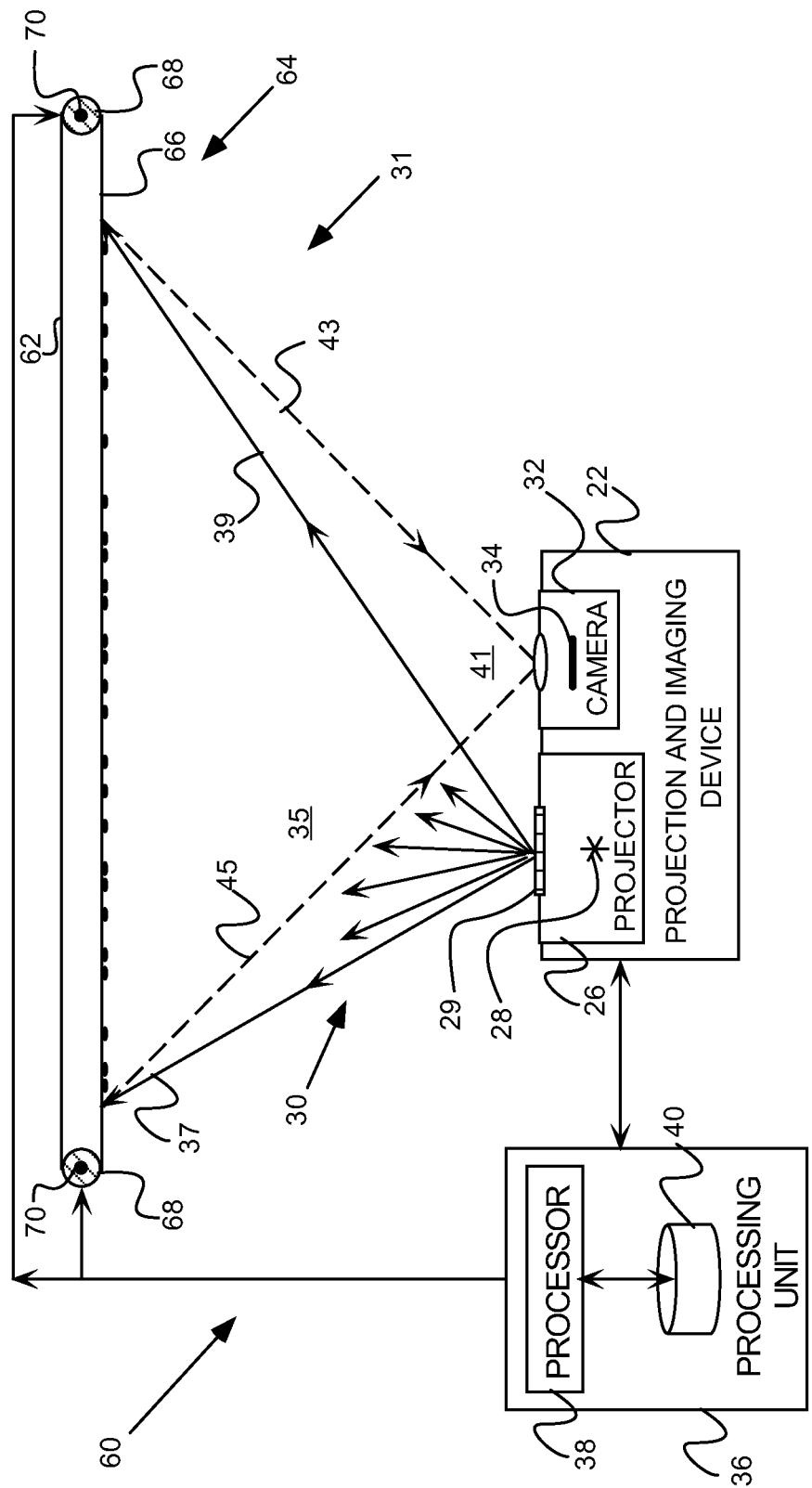
FIG. 3 is a schematic block diagram of an alternative system for generating a reference image, according to an embodiment of the present invention.

FIG. 3 is a schematic block diagram of an alternative system 60 for generating a reference image, according to an embodiment of the present invention. Apart from the differences described below, the operation of system 60 is generally similar to that of system 20, and elements indicated by the same reference numerals in both systems 20 and 60 are generally similar in construction and in operation. Instead of moving device 22 (as in system 20), in system 60 the reference surface upon which spots 31 are formed is moved.

By way of example, in place of reference object 24, system 60 comprises a reference object 62, which is formed as a continuous sheet 64 in the form of a closed loop. Reference object 62 acts as a calibration object for system 60. Sheet 64 has an outer surface 66 that is non-specular. Sheet 64 is mounted on rollers 68 which may be rotated by respective rotators 70, under control of processing unit 36. In some embodiments, only one rotator is used, attached to one roller 68, and the other roller is free to rotate. Since in system 60 device 22 is not moved, actuator 42 is not present in the system.

Rotation of rollers 68 moves surface 66 parallel to itself. Typically, the rotation is unidirectional so that surface 66 moves in a loop. Alternatively, the rotation of the rollers is configured to be oscillatory, so that surface 66 also moves in an oscillatory manner.

The acquisition of the reference image in system 60 is generally similar to the acquisition in system 20, as described above with reference to FIG. 2. Thus, projector 26 initially projects pattern 30 onto reference surface 66, and array 34 captures an image of spots 31 generated by the projected pattern. While capturing the image, processing unit 36 activates rotators 70 to move surface 66, so that the surface moves relative to device 22. The amplitude of the motion is configured to be sufficient to effectively average out the effects of the secondary speckles on the image of spots 31 formed on array 34. As for system 20, in system 60 the amplitude of motion required is small, and is typically of the same order of magnitude as that of system 20.

System 60 may comprise a reference object other than reference object 62, and/or means to move the reference object other than rotators 70, since any such system only requires that the reference object move relative to device 22. Thus, alternative methods for implementing the relative motion by moving the reference object include, but are not limited to, having a reference object similar to object 24, and attaching a motion actuator similar to actuator 42 to the reference object. Other types of reference object and/or motion actuators will be familiar to those having ordinary skill in the art, and are assumed to be comprised within the scope of the present invention.

Systems 20 and 60 may be combined to form a composite embodiment of the present invention. In the composite embodiment, during acquisition by array 34 of the image of spots 31, both device 22 and the reference object are moved.

Figure 4:
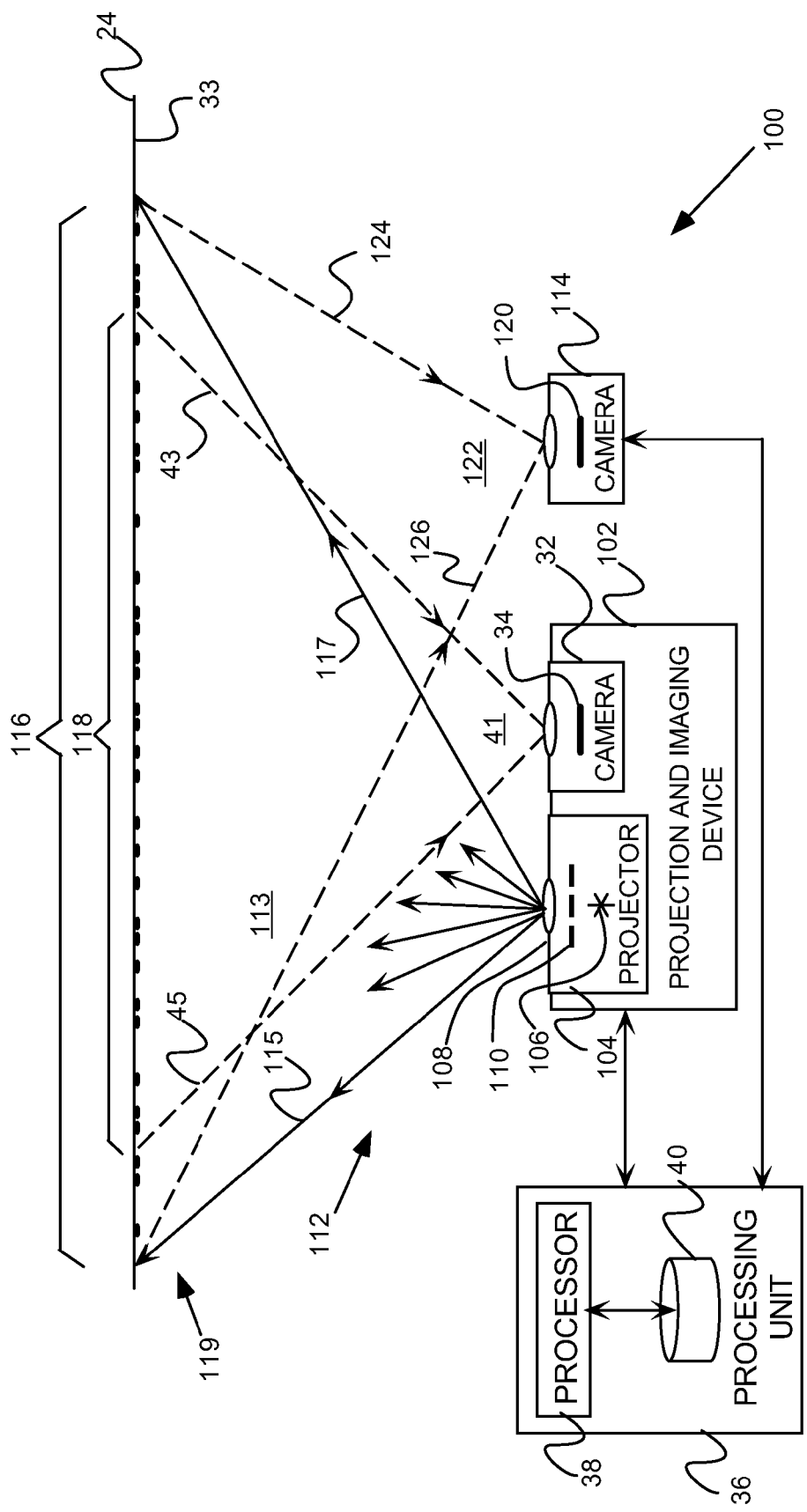
FIG. 4 is a schematic block diagram of a further alternative system for generating a reference image, according to an embodiment of the present invention.

FIG. 4 is a schematic block diagram of a further alternative system 100 for generating a reference image, according to an embodiment of the present invention. Apart from the differences described below, the operation of system 100 is generally similar to that of system 20, and elements indicated by the same reference numerals in both systems 20 and 100 are generally similar in construction and in operation.

Unlike systems 20 and 60, system 100 uses two different images of a reference object, as is explained in more detail below.

System 100 comprises a projection and imaging device 102 which is generally similar to device 22, and which comprises device camera 32, described above with reference to FIG. 1. Device 102 also comprises a projector 104, which may be generally similar to projector 26, but which in system 100 may comprise as its radiation source either a coherent or an incoherent source. Hereinbelow, for simplicity, projector 104 is assumed to comprise an incoherent source 106.

In the case of an incoherent source, in place of coherent projection optics 29 (such as a diffuser or system incorporating diffractive optical elements), projector 104 comprises optics 108, which typically have a small numerical aperture, and a mask 110. Among other possible implementations, mask 110 can either be a transmission slide or a micro-lens array designed to create the pattern to be projected. The small numerical aperture of optics 108 generates a corresponding large depth of focus of an image of the mask. A pattern 112, that is generally similar to pattern 30 (but which is not necessarily formed by coherent radiation), is formed by projector 104 imaging the mask. The pattern is projected into a projector field of view 113, which is illustrated schematically by projector FOV bounding lines 115 and 117. Pattern 112 is projected onto surface 33 to form a base reference 119, herein by way of example assumed to comprise an array of spots 119 which are generally similar to spots 31, on the surface.

System 100 comprises an image sensor 114, herein also termed external camera 114, which is separate from device 102. The external camera is typically of a significantly higher quality than the device camera. Thus, the two cameras typically have at least one different optical characteristic, such as different fields of view, different resolutions, different signal to noise ratios, or different dynamic ranges. Marketing considerations typically require the cost of the device camera to be as low as possible, so that the price of devices 22 and 102 may be as low as possible. Such considerations do not apply to the cost of the external camera, which is not intended to be marketed with devices 22 or 102. Rather, as is described hereinbelow, the external camera is used for generating the reference image for device 102, typically in a production facility for the device. Consequently, external camera 114 may have one or more of its optical characteristics, referred to above, enhanced compared to that of the device camera. For simplicity, the following description assumes the optical characteristic of the two cameras to be their field of view or their resolution, so that external camera 114 may have a larger field of view than the field of view of the device camera, and/or may have a finer resolution than the resolution of the device camera. While the field of view and the resolution of the device camera is fixed according to the field of view that is decided for device 22 or device 102, also referred to herein as the product devices, it will be understood that it is often beneficial that the reference image is formed with a larger field of view and/or better fidelity than that of any particular product device.

In the following description, external camera 114 is assumed to have both a larger field of view, and a finer resolution, than the field of view and resolution of the device camera. Those of ordinary skill in the art will be able to adapt the description, mutatis mutandis, if only one of these conditions holds, i.e., for an external camera wherein either the field of view is larger or the resolution is finer than that of the device camera.

Pattern 112 projects spots 119 onto surface 33, and the projected spots are assumed to comprise a projected set 116 of the spots. Projected set 116 is also referred to herein as full set 116. A field of view 122 of camera 114, illustrated schematically by external camera FOV bounding lines 124 and 126, is configured to encompass full set 116. In contrast, field of view 41 of the device camera is configured to encompass a subset 118 of the full set, subset 118 comprising a smaller number of spots 119 than set 116.

As stated above, the resolution of external camera 114 is assumed to be finer than the resolution of device camera 32. By way of example, the finer resolution is assumed to be achieved by external camera 114 comprising a pixel array 120 having more pixels than the number of pixels in array 34. To comply with the finer resolution and larger field of view assumed for the external camera, other characteristics of the external camera and its elements may need to be different from those of the device camera. For example, the area of array 120 may need to be greater than the area of array 34. The external camera optics are assumed to be adjusted accordingly to provide the required field of view.

Figure 5:
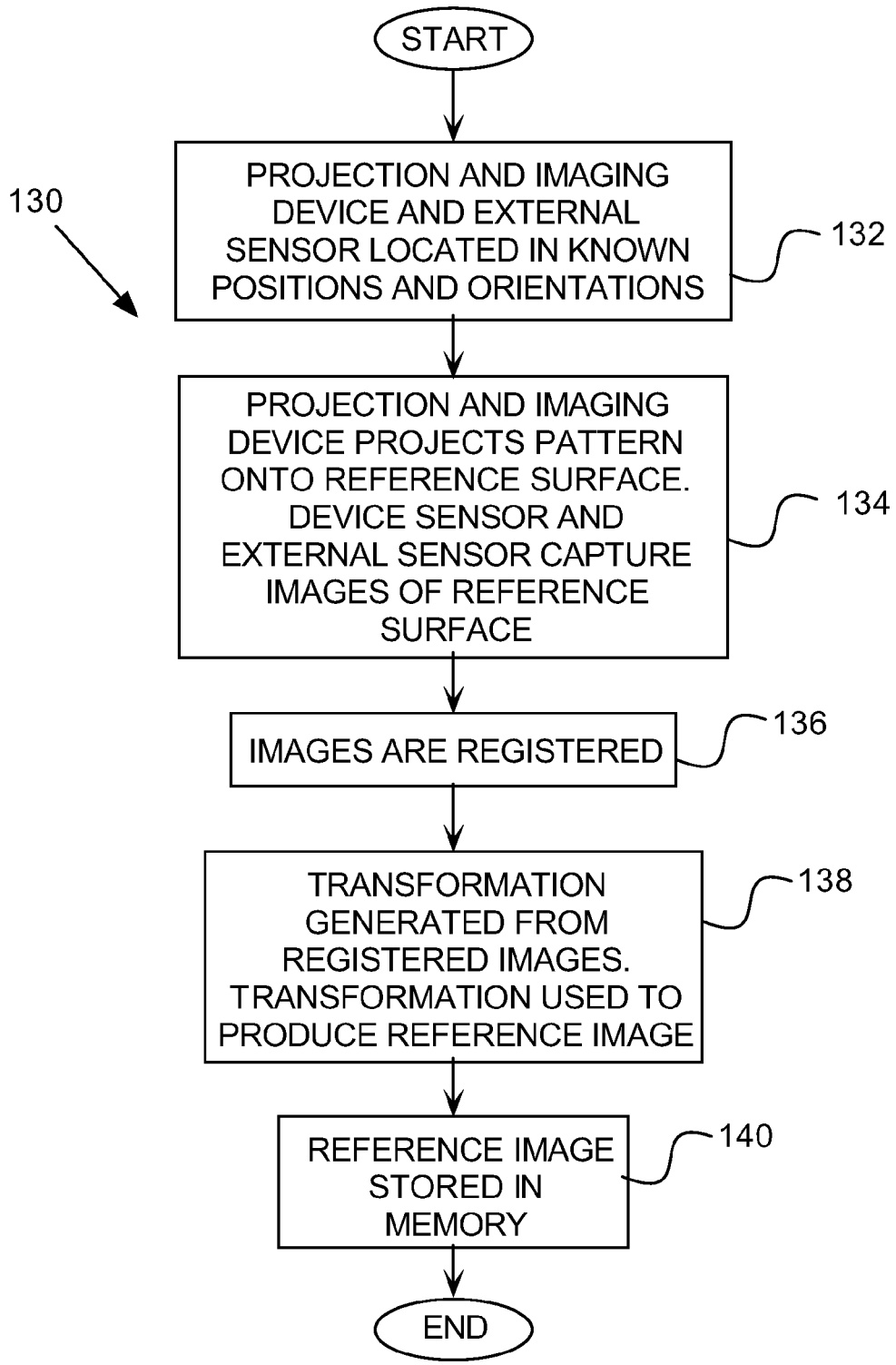
FIG. 5 is a flowchart describing steps for acquiring the reference image in the system of FIG. 4, according to an embodiment of the present invention.

FIG. 5 is a flowchart 130, describing steps for acquiring the reference image in system 100, according to an embodiment of the present invention. The description assumes, by way of example, that base reference 119 comprises array of spots 119.

In an initial step 132, device 102 and external camera 114 are located in known positions, with known orientations.

In a projection and image capture step 134, projector 104 projects pattern 112 onto reference surface 33. Array 34 captures an image of subset 118 of the spots generated by the projected pattern. In addition, array 120 captures an image of the full set of the spots.

In a registration step 136, the two images are transferred to processing unit 36. The processing unit is configured to register the two images, using spots of subset 118 that are common to both images. The registration may be by any convenient method of image registration known in the art. Typically the method used comprises a feature-based algorithm, the processing unit initially identifying the spots in each image, and then correlating spots common to both images. Typically one or both of the images may need to be locally transformed by local scaling, rotating, and/or translating of regions of the images to achieve good registration. While the local transformations are typically linear, in some embodiments the transformations may be non-linear. In addition, the processing unit may apply epipolar or other geometric relations known in the art to perform the registration, using the known positions and orientations of the device camera, the external camera, and projector 104.

In a global transformation step 138, the processing unit combines the procedures described above, including the local transformations, into a global transformation of the image captured by the external camera. The global transformation encompasses the spots of the larger field of view of the external camera, and also maintains the finer resolution of the external camera. The combined procedures may be performed, for example, by using parameters derived from the local transformations to estimate coefficients of a polynomial representing the global transformation. The processing unit then applies the global transformation to the image captured by the external camera, so producing an image suitable for use by the device camera, i.e., an image that is registered with respect to the frame of reference (described above with reference to FIG. 1) of the device camera.

In a final step 140, the image produced in step 138 is stored in memory 40 for use by the device camera as its reference image. The reference image is an enhanced image, since it includes the spots of the larger field of view of the external camera, and in addition has the finer resolution of the external camera.

Figure 6:
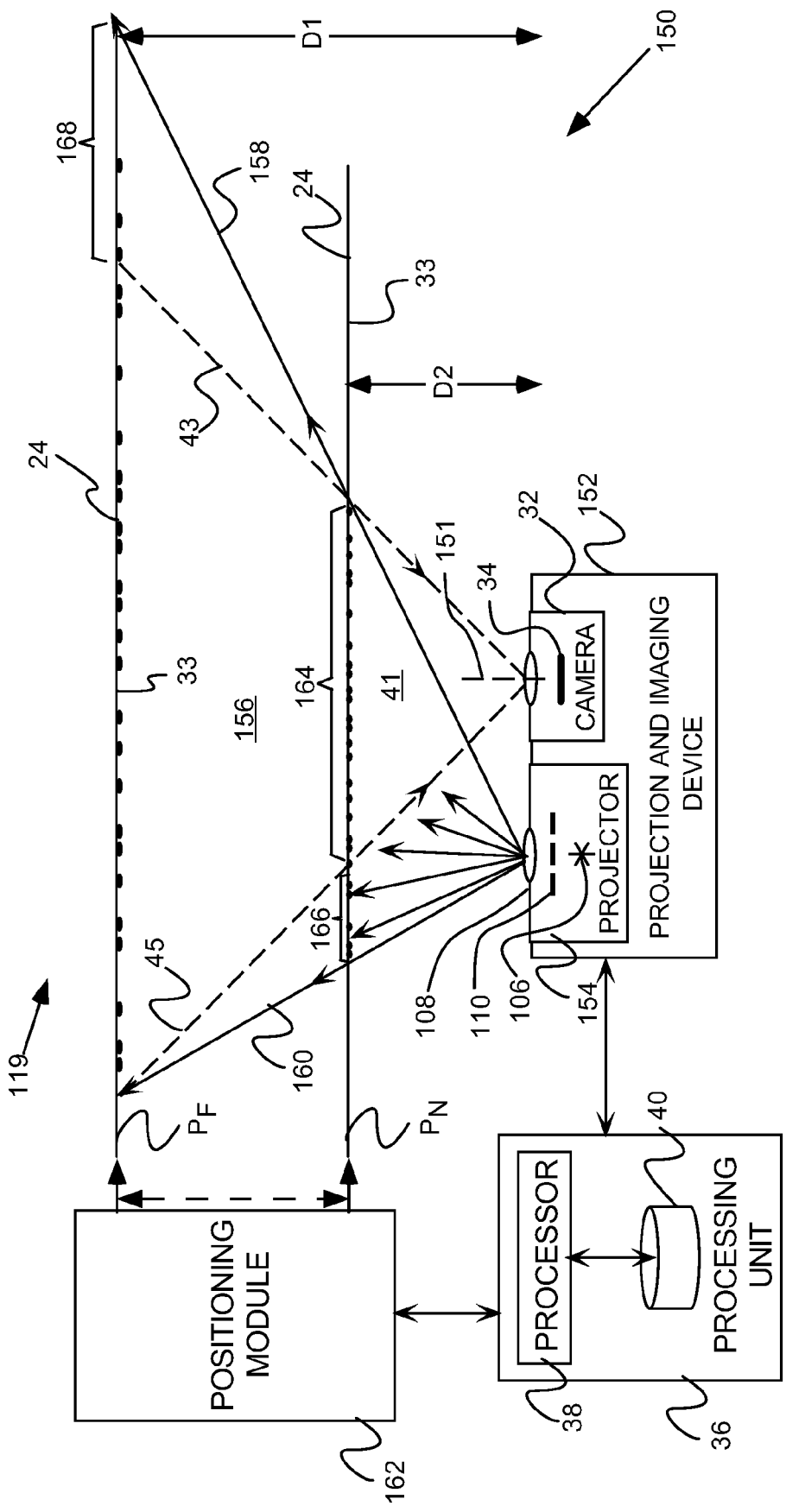
FIG. 6 is a schematic block diagram of a yet further alternative system for generating a reference image, according to an embodiment of the present invention.

FIG. 6 is a schematic block diagram of a yet further alternative system 150 for generating a reference image, according to an embodiment of the present invention. Apart from the differences described below, the operation of system 150 is generally similar to that of system 100 (FIG. 4), and elements indicated by the same reference numerals in both systems 100 and 150 are generally similar in construction and in operation.

As is the case in system 100, system 150 uses two images of reference object 24. However, system 150 does not comprise external camera 114. Rather, the two images of reference object 24 are formed by device camera 32 when the object is at different distances, D1 and D2, D1>D2, from a projection and imaging device 152, which except as explained below, is generally similar to device 102. D1 and D2 are typically measured parallel to an optical axis 151 of camera 32.

Projection and imaging device 152 in system 150 comprises device camera 32 and a projector 154. Projector 154 is generally similar to projector 104, but may have a different field of view. A field of view 156 of projector 154, illustrated in FIG. 6 by projector FOV bounding lines 158 and 160, is configured so that a subset of the spots projected by the projector onto reference object 24, when the reference object is at distance D1, are within the field view of the device camera.

In one embodiment, object 24 is connected to a positioning module 162, which is controlled by processing unit 36. Module 162 is configured to reposition reference object 24 according to instructions from processing unit 36, and is also configured so that the processing unit is aware of the positions of the object. Alternatively or additionally, a positioning module generally similar to module 162 is connected to device 152, so that the device may be located in known positions by unit 36. Further alternatively, reference objects at distances D1 and D2 can be located in different physical locations, and the device 152 is statically positioned in these locations, in which case there is no need for positioning module 162.

Figure 7:
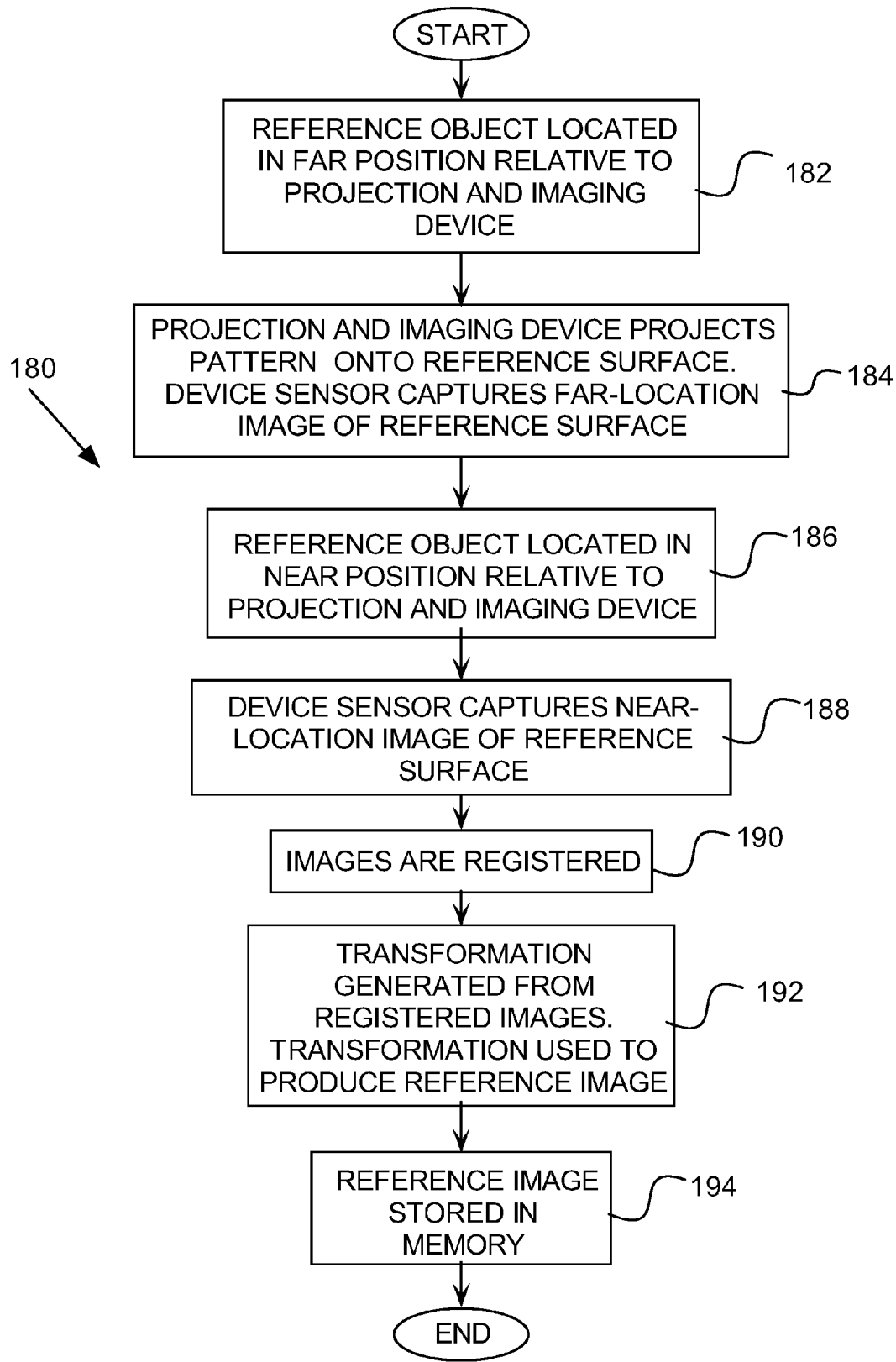
FIG. 7 is a flowchart describing steps for acquiring the reference image in the system of FIG. 6, according to an embodiment of the present invention

FIG. 7 is a flowchart 180, describing steps for acquiring the reference image of system 150, according to an embodiment of the present invention. In the description, the different distances between the device and the reference object are assumed to be implemented using module 162. The description assumes, by way of example, that base reference 119 comprises array of spots 119.

In an initial step 182, module 162 locates reference object 24 in a far position $P_F$ so that it is distance D1 from device 152.

In a first projection and imaging step 184, projector 154 projects its pattern of spots 119 onto surface 33 of the reference object, and camera 32 captures a first image of the surface. The first image is also referred to herein as the far-location image.

In a second projection and imaging step 186, module 162 locates the reference object in a near position $P_N$, so that it is distance D2, smaller than D1, from device 152. As is illustrated in FIG. 6, in the near position, a subset 164 of spots 119 is in the field of view of the device camera, and a subset 166 of the spots is not in the camera's field of view. However, spots corresponding to subset 166 are in the camera's field of view at the far position, $P_F$. In addition, subset 164 includes a further subset 168 of spots 119, subset 168 being within the camera's field of view at the near position $P_N$, but not in its field of view at the far position $P_F$.

In a third projection and imaging step 188 device camera 32 captures a second image of surface 33 when the reference object is in near position $P_N$. The second image is also referred to herein as the near-location image.

In a registration step 190, processing unit 36 registers the far-location and near-location images, using spots that are common to the two images. The registration is generally as is described for registration step 136 of flowchart 130, mutatis mutandis, using local transformations and geometric relations that are appropriate for system 150, such as relations that may be applied from the known distances D1 and D2 of the images.

In a global transformation step 192, the processing unit combines the procedures performed in the registration step into a global transformation of the spots of the far-location image onto the near-location image. Transformation step 192 is generally similar, mutatis mutandis, to transformation step 138 of flowchart 130. In transformation step 192, the processing unit produces a reference image comprising all the spots of the far-location image at near position $P_N$. The reference image thus corresponds to an effective field of view larger than the actual FOV, as is illustrated in FIG. 6, since the reference image includes positions of subset 166 of spots 119.

Referring back to FIG. 6, the figure illustrates a beneficial property of the reference image of embodiments of the present invention: that subsets of the reference image correspond to the FOV of the device at different distances from the device. In other words, the reference image typically comprises a superset of the FOV of the device at a particular distance. This property is illustrated by the description above with reference to subset 166, which as stated, is within the far position FOV, but not within the near position FOV, and also with reference to subset 168, which is within the near position FOV, but not within the far position FOV.

Continuing with flowchart 180, in a final step 194 processing unit 36 stores the reference image produced in step 190 in memory 40.

The description above, with reference to systems 100 and 150, has assumed capturing and registering two images to produce an enhanced reference image for use in the systems. Those having ordinary skill in the art will be able to adapt the description for the cases of capturing and registering more than two images, in order to produce further enhanced reference images, and such cases are assumed to be comprised within the scope of the present invention.

Figure 8:
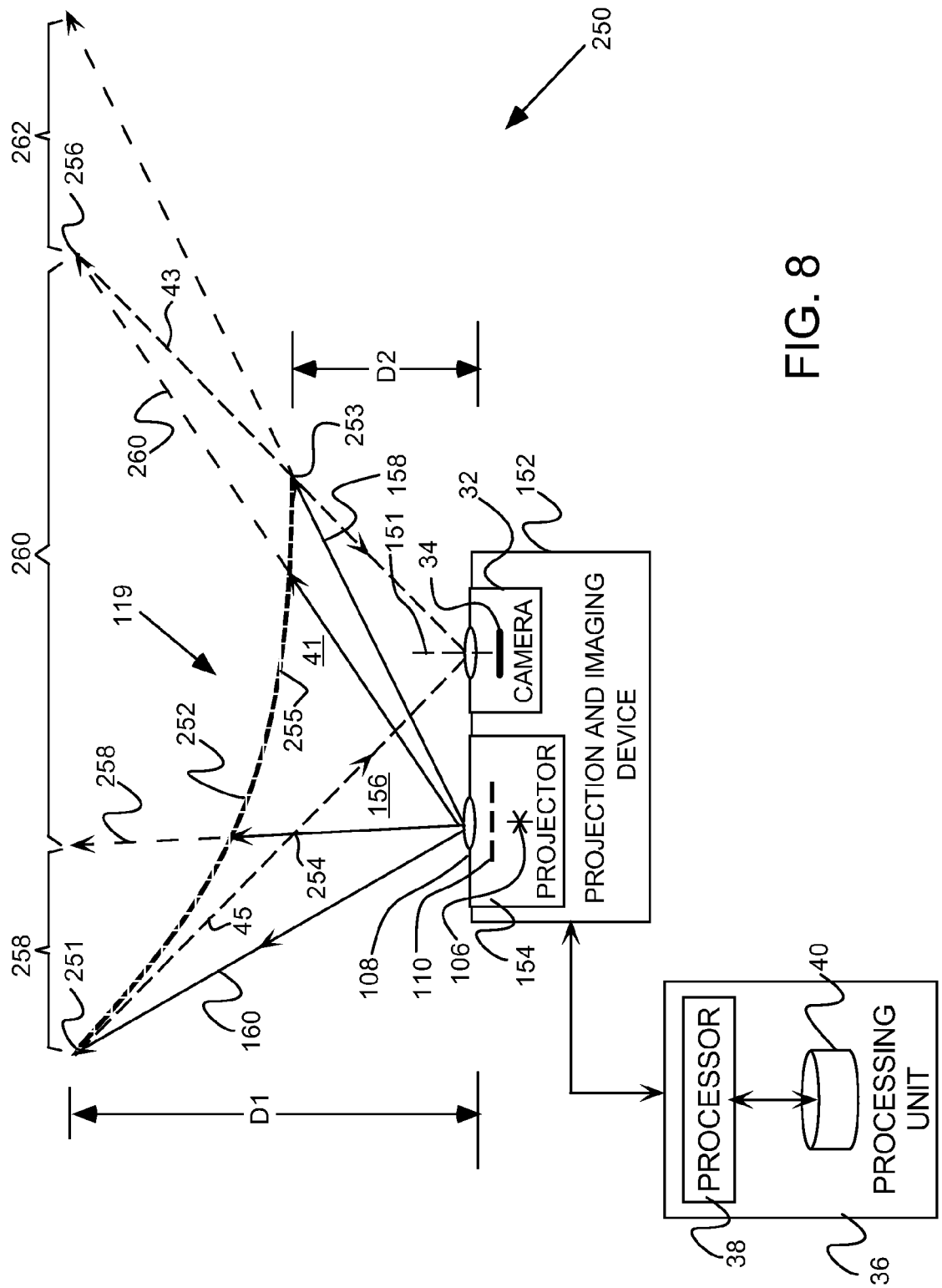
FIG. 8 is a schematic block diagram of another alternative system for generating a reference image, according to an embodiment of the present invention.

FIG. 8 is a schematic block diagram of another alternative system 250 for generating a reference image, according to an embodiment of the present invention. Apart from the differences described below, the operation of system 250 is generally similar to that of system 150 (FIG. 6), and elements indicated by the same reference numerals in both systems 250 and 150 are generally similar in construction and in operation.

Unlike system 150, system 250 does not comprise positioning module 162, or reference object 24. Rather, system 250 comprises a reference object 252 which has a surface 255 having varying distances, measured parallel to optical axis 151, to device 152, so that the surface is not necessarily oriented orthogonally with respect to the optical axis. By way of example, surface 255 is assumed to be a distance D1 from device 152 at a point 251 on the reference object, and to be a distance D2 from device 152 at a point 253 on the reference object. Array of spots 119 are projected onto surface 255.

In system 250, reference object 252 and its surface are assumed to be curved, typically in the dimension substantially parallel to the triangulation base (a vector connecting camera 32 and projector 154) of device 152. Typically the curvature is preconfigured to match a geometrical disparity between camera 32 and projector 154 of device 152, so as to introduce a constant rate of shrinkage of a captured reference image at camera 32.

In FIG. 8, a line 258 corresponds to a first direction of projection from projector 154. Line 258 passes from optics 108 through a point 254 which is distant D2 from device 152 and which lies on bounding line 45. A line 260 corresponds to a second direction of projection from projector 154. Line 260 passes from optics 108 through a point 256 which is distant D1 from device 152 and which lies on bounding line 43.

Projector bounding lines 158 and 160, and lines 258 and 260, define subsets of spots 119 on surface 255. A subset 258 is bounded by lines 160 and 258; a subset 260 is bounded by lines 258 and 260; and a subset 262 is bounded by lines 260 and 158. Thus, the reference image generated on surface 255 comprises subsets of captured images of camera 32 at different distances from the camera.

Figure 9:
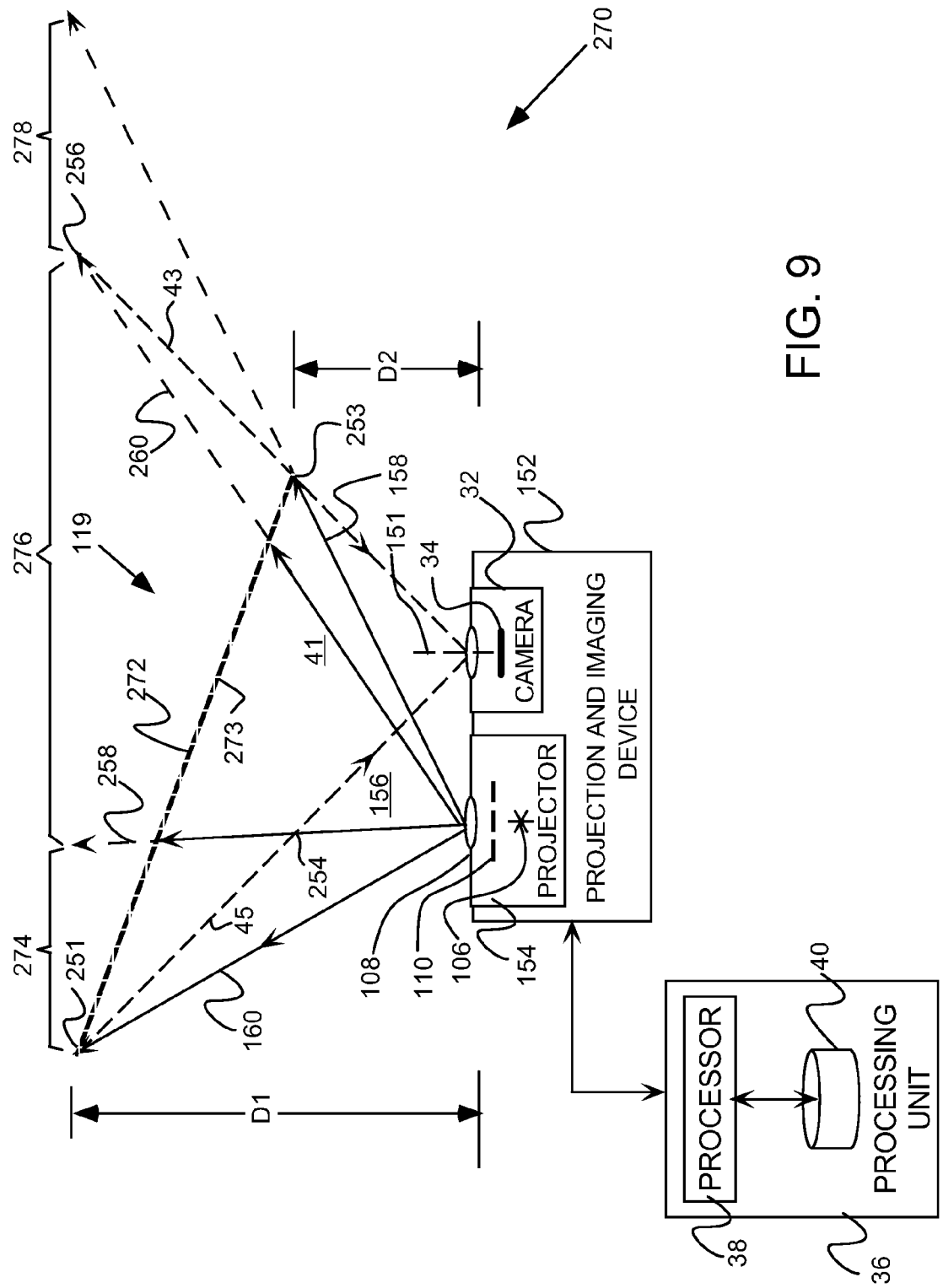
FIG. 9 is a schematic block diagram of yet another alternative system for generating a reference image, according to an embodiment of the present invention.

FIG. 9 is a schematic block diagram of yet another alternative system 270 for generating a reference image, according to an embodiment of the present invention. Apart from the differences described below, the operation of system 270 is generally similar to that of system 250 (FIG. 8), and elements indicated by the same reference numerals in both systems 270 and 250 are generally similar in construction and in operation.

In system 270, a reference object 272 replaces reference object 252 of system 250. Reference object 272 comprises a planar surface 273 which is not orthogonal to axis 151. In system 270 the planar surface has distances from device 152 which vary from D1 to D2. As for system 250, in system 270 projector bounding lines 158 and 160, and lines 258 and 260, define subsets of spots 119 on surface 273. A subset 274 is bounded by lines 160 and 258; a subset 276 is bounded by lines 258 and 260; and a subset 278 is bounded by lines 260 and 158. Subsets 274, 276, and 278 respectively correspond to subsets 258, 260, and 262 of system 250 (FIG. 8), so that, as for system 250, the reference image generated on surface 273 comprises subsets of captured images of camera 32 at different distances from the camera.

Consideration of FIGS. 8 and 9 illustrate a property of systems 250 and 270: that using one reference object encompassing a wide field of view of the projector enables reference images to be generated for cameras having smaller fields of view than that of the projector.

Figure 10:
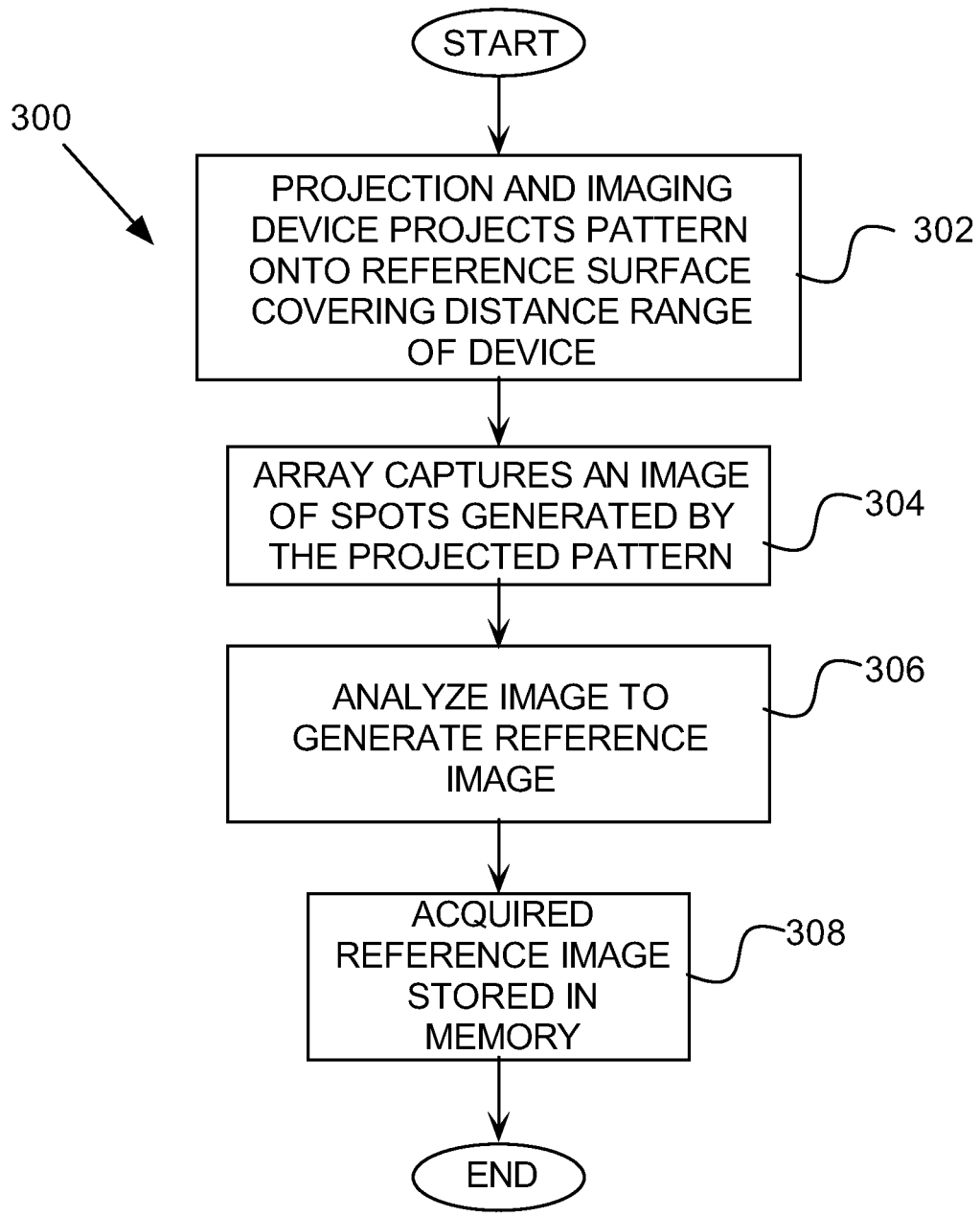
FIG. 10 is a flowchart describing steps for acquiring the reference image of the system of FIG. 8 or of FIG. 9, according to an embodiment of the present invention.

FIG. 10 is a flowchart 300, describing steps for acquiring the reference image of system 250 or of system 270, according to an embodiment of the present invention. For simplicity and clarity, the description refers to system 250. Those having ordinary skill in the art will be able to adapt the description of the flowchart, mutatis mutandis, for system 270. The description assumes, by way of example, that base reference 119 comprises array of spots 119.

In an initial step 302, reference object 252 is positioned in front of device 152, and projector 154 projects spots 119 onto the surface of the reference object. Distances D1 and D2 are selected to cover a desired distance range, which typically comprises all working distances of device 152.

In an image capture step 304, camera 32 captures an image of the projected spots.

In an analysis step 306, processing unit 36 analyzes the image. The analysis straightens the image and/or allows for the depth accuracy curve of the device, as necessary, to generate a reference image. The reference image is valid over all fields of view of device 152 and all working distances of the device, and is registered with respect to a frame of reference of the camera.

In a final step 308, the reference image is stored in memory 40, for use by processor 38 in 3D mapping of a test object.

Embodiments of the present invention may be combined to produce enhanced reference images. For example, if the projector in system 100 is configured to use coherent radiation, the secondary speckles introduced into system 100 may be eliminated using system 20. Similarly, secondary speckles may also be eliminated in systems 250 and 270 using system 20. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for three-dimensional mapping, comprising:
providing a mapping device, which comprises:
a projector configured to project a pattern onto an object;
a first image sensor, which has a first optical characteristic and is configured to capture images of the object on which the pattern is projected;
a memory configured to store a reference image of the pattern; and
a processor configured to measure shifts in the pattern in the images relative to the stored reference image in order to generate a three-dimensional (3D) map of the object;
generating the reference image in a production facility by:
operating the mapping device so as to project the pattern onto a reference surface, prior to projecting the pattern onto the object;
capturing a second image of the pattern on the reference surface using a second image sensor, which is external to and separate from the mapping device and has a second optical characteristic that is enhanced relative to the first optical characteristic; and
registering the first and second images to produce the reference image, which is registered in a frame of reference of the projection and imaging device, wherein registering the first and second images comprises identifying and correlating features common to the first and second images in order to find local transformations, and then combining the local transformations to apply a global transformation to the second image in order to produce the reference image;
storing the reference image produced by registering the first and second images in the memory of the mapping device; and
generating the 3D map using the mapping device by projecting the pattern onto the object, capturing the images of the object using the first image sensor, and measuring the shifts in the pattern relative to the stored reference image.

2. The method according to claim 1, wherein the pattern is projected using incoherent radiation.

3. The method according to claim 1, wherein the enhanced optical characteristic comprises an enhanced field of view.

4. The method according to claim 1, wherein the enhanced optical characteristic comprises an enhanced resolution.

5. The method according to claim 1, wherein the enhanced optical characteristic comprises an enhanced signal to noise ratio.

6. The method according to claim 1, wherein the enhanced optical characteristic comprises an enhanced dynamic range.

7. Apparatus, comprising:
a mapping device comprising:
  a projector configured to project a pattern onto an object;
  a first image sensor, which has a first optical characteristic and is configured to capture images of the object on which the pattern is projected;
  a memory configured to store a reference image of the pattern; and
  a processor configured to measure shifts in the pattern in the images relative to the stored reference image in order to generate a three-dimensional (3D) map of the object; and
an assembly for generating the reference image in a production facility, comprising:
  a second image sensor, which is external to and separate from the mapping device and has a second optical characteristic that is enhanced relative to the first optical characteristic,
  wherein the mapping device is operated in the production facility, prior to projecting the pattern onto the object, to project the pattern onto a reference surface and to capture a first image of the pattern projected onto the reference surface using the first image sensor, and
  wherein the second image sensor is configured to capture a second image of the pattern projected by the projector onto the reference surface; and
  a processing unit, which is configured to register the first and second images to produce the reference image, which is registered in a frame of reference of the projection and imaging device, wherein registering the first and second images comprises identifying and correlating features common to the first and second images in order to find local transformations, and then combining the local transformations to apply a global transformation to the second image in order to produce the reference image;
wherein the processor is configured to store the reference image produced by registering the first and second images in the memory of the mapping device.

8. The apparatus according to claim 7, wherein the pattern is projected using incoherent radiation.

9. The apparatus according to claim 7, wherein the enhanced optical characteristic comprises an enhanced field of view.

10. The apparatus according to claim 7, wherein the enhanced optical characteristic comprises an enhanced resolution.

11. The apparatus according to claim 7, wherein the enhanced optical characteristic comprises an enhanced signal to noise ratio.

12. The apparatus according to claim 7, wherein the enhanced optical characteristic comprises an enhanced dynamic range.

* * * * *